Nov. 6, 1962 W. J. POPOWSKY 3,062,967

HIGH SPEED SWITCHING DEVICE FOR LOW LEVEL SIGNALS

Filed Nov. 12, 1957

INVENTOR.
WILLIAM J. POPOWSKY
BY Arthur H. Swanson
ATTORNEY.

United States Patent Office 3,062,967

Patented Nov. 6, 1962

3,062,967

HIGH SPEED SWITCHING DEVICE FOR LOW LEVEL SIGNALS

William J. Popowsky, Montgomery, Md., assignor to Minneapolis-Honeywell Regulator Company, Minneapolis, Minn., a corporation of Delaware Filed Nov. 12, 1957, Ser. No. 695,665
7 Claims. (Cl. 307—88.5)

Figure 1:
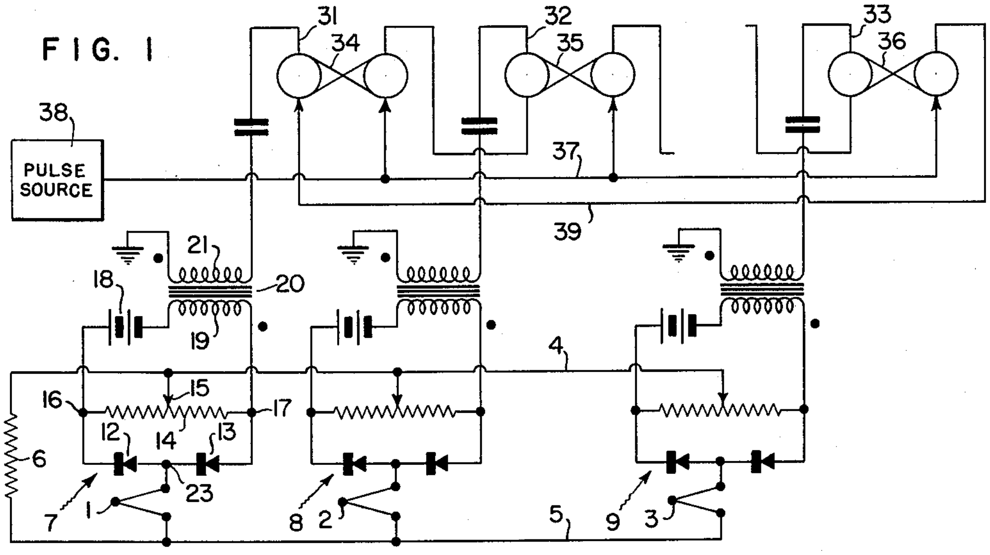

This invention relates to apparatus for switching electrical signals. More specifically, the present invention relates to that class of electrical switching apparatus designed to switch low-level signals at high speeds.

It is frequently desirable to be able to switch between a plurality of low-level signals to apply samples of those signals to the input of a single instrumentality. This is particularly true in the field of instrumentation where it is often desirable to be able to multiplex the signals from a plurality of primary sensing elements, such as thermocouples, into the input of a single recording, controlling, or indicating instrument. Although such signals have been successfully switched by mechanical means, recent improvements in the computer and instrumentation art have made it necessary to switch such signals at speeds beyond those capable of achieving by mechanical switching means. Although electronic switching means have been provided which are capable of achieving the high speeds desired, said switching means have proven incapable of switching low-level signals without introducing noise signals of comparable magnitudes. One solution to this problem would be to amplify the data signals prior to switching but this would require a separate amplifier for each signal to be multiplexed. While this might prove satisfactory where the number of signals to be switched is small, the expense of separate amplifiers for each channel would be prohibitive where the number of signals to be switched is large.

It is, accordingly, a general object of the present invention to provide a new and improved low-level high speed switch.

A specific object of the present invention is to provide a new and improved switching apparatus utilizing diodes as the switching elements.

Another specific object of the present invention is the utilized diodes connected in a bridge circuit in such a manner that their forward resistance drops cancel.

Still another object of the present invention is to provide a zero adjusting means for the diode switch to insure satisfactory low-level operation.

A further object of the present invention is to provide a new and improved diode switching apparatus which can be adapted for either single or double pole operation.

The various objects of the present invention are achieved in a system in which a pair of diodes are connected as adjacent arms of a bridge circuit with an adjustable resistor forming the other two bridge circuit arms. The bridge is energized in such a manner as to reverse bias the diodes so that they cannot conduct until this reverse bias is overcome by a switching pulse derived from means connected in series with the bias source in the bridge energizing circuit. The signal to be switched is connected in series with the load across the output terminals of the bridge circuit. In this manner, the back resistance of one of the diodes is in series with the load until the reverse bias on the diodes is overcome by a switching pulse.

Figure 2:
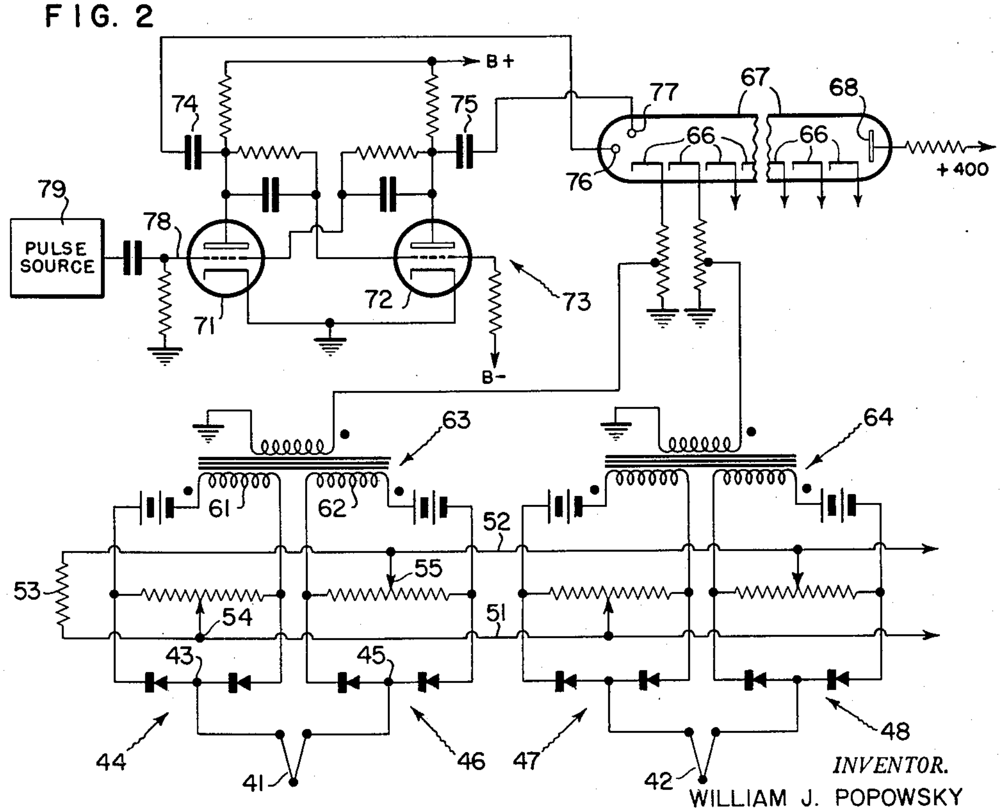

A better understanding of the present invention may be had from the following description read with reference to the accompanying drawings of which:

FIG. 1 is a circuit diagram of an embodiment of the present invention adapted for use as a single pole switch; and FIG. 2 is a circuit diagram of an embodiment of the present invention adapted for use as a double pole switch.

Referring now to FIG. 1, there is shown one embodiment of the multiplexer or high speed switch of the present invention adapted to sequentially connect a plurality of thermocouples 1, 2, and 3 across a pair of output lines 4 and 5. For simplicity, only three switching channels are shown but the principle of operation of the present invention will be apparent from the explanation of these three channels. It will also be apparent to those skilled in the art that the apparatus of FIG. 1 can be adapted to switch fewer or greater numbers of electrical signals. The load to which the thermocouples 1, 2, and 3 are to be sequentially connected is shown diagrammatically as a resistor 6 connected across the output lines 4 and 5. The apparatus shown in FIG. 1 is adapted for single pole switching operation and thus, one terminal of each of the thermocouples 1, 2, and 3 is directly connected to the output line 5. The other terminals of the thermocouples 1, 2, and 3 are connected to the output line 4 through the diode switching networks 7, 8, and 9 respectively. Each of the diode switching networks 7, 8, and 9 are identical in operation and construction and thus the operation and construction of only the switching network 7 will be discussed in detail.

The switching network 7 employs the diodes 12 and 13 connected as adjacent arms of a bridge circuit. The diodes 12 and 13 may be any type of diodes but are preferably semi-conductor silicon diodes having a high back to forward resistance ratio. The other two arms of the bridge circuit comprise the portions of a slidewire resistor 14, adjacent a sliding contact 15 on the slidewire resistor 14. The bridge circuit formed by the slidewire resistor 15 and the diodes 12 and 13 has a pair of input or energizing terminals 16 and 17. As shown, a battery 18 and a secondary winding 19 of a transformer 20 are connected in series across the input terminals 16 and 17. It should be noted, that the battery 18 is poled to apply a reverse bias across the diodes 12 and 13. The transformer 20 has a primary winding 21 which is adapted to receive a switching pulse of sufficient magnitude to overcome the reverse bias applied across the diodes 12 and 13 by the battery 18. The connection of the transformer 20 to a source of switching pulses will be explained in detail hereinafter. In addition to the input terminals 16 and 17, the bridge circuit of the switching network 7 has a pair of output terminals which comprise the slider contact 15 on the slidewire resistor 14 and the junction 23 of the diodes 12 and 13. As shown, the thermocouple 1 and the load resistor 6 are connected in series across the output terminals 14 and 23 by means of the output lines 4 and 5.

In considering the operation of the switching network 7, it should be noted that the battery 18 is poled to apply a reverse bias across the diodes 12 and 13. Accordingly, the back impedance of both of the diodes 12 and 13 is in series with the thermocouple 1 and the load resistor 6. The back impedance of the diodes can be on the order of 100 megohms and thus acts as an open circuit between the thermocouple 1 and the load 6 until the reverse bias on the diodes is overcome. The transformer 20 is adapted to receive at its primary winding 21 a negative pulse and to supply at the secondary winding 19 a pulse in opposition to the battery 18 to overcome the reverse bias applied across the diodes 12 and 13 by the battery 18. When a pulse of the proper magnitude and polarity to overcome the reverse bias of the battery 18 is applied to the transformer 20 the diodes 12 and 13 are biased for conduction in their forward or low resistance direction.

During the interval that this forward bias exists across the diodes 12 and 13, the impedance in series with the thermocouple 1 and the load 6 is that of the two halves of the bridge connected in parallel. In practice, this resistance can be in the order of 50 ohms, which, in series with a load of any reasonable value, will insure that substantially all the signals from the thermocouple 1 will appear across the circuit load.

It should be noted, that the bridge circuit of the switching network 7 can be adjusted by adjusting the slider contact 15 on the slidewire resistor 14 to balance the forward resistances of the diodes 12 and 13. When the bridge circuit is properly balanced, none of the switching pulse or the voltage of the battery 8 are applied across the load resistor 6. Accordingly, the switching circuit of FIG. 1 provides a means for switching low-level signals at exceptionally high speeds without the introduction of extraneous signals into the load circuit.

Referring again to FIG. 1, the means for sequentially applying the switching pulse to the switching network 7, 8, and 9 in order to achieve a high rate of switching will be discussed in detail. As shown, the primary windings of each of the transformers of the switching circuit 7, 8, and 9 are capacity coupled to control terminals 31, 32, and 33, respectively, of the bi-stable vacuum tube circuits 34, 35, and 36 which may be of the Eccles-Jordan trigger type. In the arrangement as illustrated for simplicity in FIG. 1, each of the bi-stable vacuum tube circuits 34, 35, and 36 has a synchronizing input connection through a line 37 to the output of a pulse source 38. The pulse source 38 can be the type of pulse source operative to deliver to the line 37 negative pulses of sufficient magnitude to shift the state of the bi-stable circuit 34, 35, and 36 at the desired switching rate. The bi-stable circuits 34, 35, and 36 are arranged in ring form as shown by the feedback connection 39, from one of the tubes of the unit 36 back to the input terminal of one of the tubes of the unit 34. Accordingly, for each pulse delivered to line 37 by the pulse source 38, the ring of bi-stable circuits 34, 35, and 36 is advanced one step to pulse a different one of the transformers of the switching circuit 7, 8, and 9. In this manner the combination of the diode switching circuits and the bi-stable ring connected pulsing means provides a low-level switching apparatus adapted to operate at speeds well in excess of tens of thousands of switching operations per second.

Referring now to FIG. 2, there is shown a circuit diagram of an embodiment of the present invention adapted to function as a double pole switch. In this embodiment two switching circuits, each identical to the switching circuits 7, 8, and 9 of FIG. 1, are employed for each electrical signal to be switched. For simplicity, the switching circuits for only two variables are illustrated but it will be apparant to those skilled in the art that this embodiment of the present invention may be adapted to switch any number of signals. By way of illustration, the two sources of electrical signals to be switched are shown as the thermocouples 41 and 42. The thermocouple 41 is connected between one output terminal 43 of a switching network 44 and a similar output terminal 45 of a switching network 46. The thermocouple 42 is connected between the similar output terminals of the switching networks 47 and 48. These switching networks are adapted to switch the outputs of the thermocouples 41 and 42 across a pair of output lines 51 and 52 to which a load, shown here as a resistor 53, is connected. Accordingly, the output line 51 is connected to the other output terminal 54 of the switching network 44 and the output line 52 is connected to the other output terminal 55 of the switching network 56. Similarly, the output line 51 is connected to the similar output terminal of the switching network 47 and the output line 52 to a similar output terminal of the switching network 48.

In order to achieve simultaneous switching of both poles of the thermocouple 41, the transformer secondary winding 61 in the energizing branch of the switching circuit 44 and the secondary winding 62 in the energizing branch of the switching circuit 43 constitute windings of a single transformer 63. As shown, a similar transformer 64 is employed for pulsing the two switching networks 47 and 48 associated with the thermocouple 42.

In order to sequentially pulse the transformer 63 and 64 for switching the thermocouple 1 and 2 the primary windings of these transformers are each coupled to one of the plurality of cathodes 66 of a cold cathode beam switching tube 67. The beam switching tube 67 is characterized in that a conductive path is provided between the anode 68 thereof and a selected one of the polarity of cathodes 66. When properly triggered, the tube may be arranged to cause the conductive path to proceed sequentially, on a predetermined time base, from one cathode to the next. This triggering means includes a pair of electron tubes 71 and 72 connected in a circuit to constitute a monostable multivibrator generally designated as 73. The dual output of the multivibrator 73 is connected through the capacitors 74 and 75, respectively, to the control electrodes 76 and 77 of the switching tube 67. Although the control electrodes 76 and 77 are schematically represented as being two in number, there are, in fact, two such electrodes for each of the cathodes 66. Since, however, corresponding ones of these electrodes are connected in parallel, the single schemetic showing is sufficient for the purpose of this disclosure. The alternate keying of these control electrodes causes the conductive path in the tube 67 to step sequentially from cathode to cathode. To accomplish this keying the control electrode 78 of the multivibrator circuit 73 is connected to a suitable source of pulses 79.

As the alternate keying of the control electrodes 76 and 77 of the beam switching tube 67 causes the conductivity path in the tube 67 to step sequentially from cathode to cathode, a positive pulse is delivered to the transformer primary winding connected thereto. This pulse is developed across the resistor in the associated cathode. When such a pulse is applied to the primary winding of one of the transformers, the switching circuits associated therewith are rendered conductive, in that the switching pulse overcomes the reverse bias applied across the diodes therein. For the duration of the pulse, both poles of the electrical signal to be switched are connected across the load resistor 53. In this manner, the embodiment of the present invention shown in FIG. 2 is adapted to provide an effective high speed low-level switching.

Having described this invention that which is claimed as new and that which it is desired to secure by Letters Patent is:

1. A diode switching circuit comprising, in combination, a source of bias voltage and a transformer connected in series, a pair of diodes connected in series, a slidewire resistor having an adjustable tap, said pair of diodes and said slidewire resistor being connected in parallel across said bias source and said transformer in such a manner that the bias source applies a reverse bias to said diodes, and means connected to said transformer to apply thereto a voltage sufficient to overcome said reverse bias and apply a forward bias to said diodes, and means connecting the signal to be switched and a load in series between the junction of said diodes and the adjustable tap of said resistor.

2. Apparatus as specified in claim 1 wherein said diodes are semiconductor silicon diodes.

3. An apparatus for switching a plurality of variables in sequence across a load comprising, in combination, a switching means for each of said plurality of variables, each of said switching means comprising, a pair of diodes connected as adjacent arms of a bridge circuit, a source of voltage poled to apply a reverse bias across said diodes and means connected in series with said source and adapted to receive a switching pulse to overcome said reverse bias and apply a forward bias across said diodes, means for connecting said load serially with each of said variables through corresponding ones of said switching means, and a bi-stable circuit for each of said switching means, the output of each of said bi-stable circuit being connected to an associated switching means, said bi-stable circuits being ring connected and each having a control terminal whereby pulses applied to such terminal shifts the states of said bi-stable circuits successively for pulsing said switching means in succession.

4. An apparatus for switching a plurality of electrical signals to a load comprising, in combination, a pair of bridge circuits for each of the variables to be switched, each of said bridge circuits having a pair of diodes connected as adjacent arms thereof, said bridge circuits having a pair of input terminals and a pair of output terminals, a source of voltage connected to said input terminals and poled to apply a reverse bias across said diodes, and a source of switching voltage connects in series with said first source across said input terminals and operative when energized to overcome said first source and apply a forward bias across said diodes, each of said electrical signals to be switched being connected between one of the output terminals of one of the associated pair of bridge circuits and the similar output terminal of the other of the associated pair of bridge circuits, said load being connected between the others of said output terminals of each of said pairs of bridge circuits, and means for energizing the sources of switching voltage of said pairs of bridge circuits in sequence to sequentially connect said electrical signals to said load.

5. Apparatus as specified in claim 4 wherein said last mentioned means comprises a beam switching tube having an anode and a plurality of cathodes, one for each of the signals to be switched, means for energizing said beam switching tube to develop a conductive path between said anode and one of said cathodes, and means for shifting said conductive path sequentially from cathode to cathode, the sources of switching voltage for each of said pairs of bridge circuits being connected for energization to a respective cathode of said beam switching tube.

6. An electronic switching system for low-level signals comprising, in combination, a pair of diode switching circuits for each of said signals to be switched, each one of said switching circuits comprising, a source of bias voltage and a transformer secondary winding connected in series, a pair of diodes connected in series, and a slidewire resistor having an adjustable tap, said pair of diodes and said slidewire resistor being connected in parallel across said bias source and said transformer secondary winding in such a manner that the bias source applies a reverse bias to said diodes, the secondary windings in the switching circuits of each pair of switching circuits being windings of a transformer common to that pair of switching circuits, each of the signals to be switched being connected between the junction of the series connected diodes in one of said associated pair of switching circuits and the junction of the series connected diodes in the other of said associated pair of switching circuits, the load being connected between the taps on the slidewire resistors of said pairs of switching circuits; and means connected to each of said transformer to energize them in sequence to apply thereto a voltage sufficient to overcome the reverse bias on the diodes in said pairs of switching circuits to switch said low-level signals across said load in sequence.

7. Apparatus as specified in claim 6 wherein said last mentioned means comprises a beam switching tube having an anode and a plurality of cathodes, one for each pair of switching circuits, means for energizing said beam switching tube to develop a conductive path between said anode and one of said cathodes, and means for shifting said conductive path sequentially from cathode to cathode, the transformer for each of said pairs of switching circuits being connected for energization to a respective cathode of said beam switching tube.

References Cited in the file of this patent

UNITED STATES PATENTS

| | | |
|---|---|---|
| 2,098,370 | Bartels | Nov. 9, 1937 |
| 2,426,454 | Johnson | Aug. 26, 1947 |
| 2,443,195 | Pensyl | June 15, 1948 |
| 2,577,015 | Johnson | Dec. 4, 1951 |
| 2,635,810 | Townsend | Apr. 21, 1953 |
| 2,639,386 | Karpeles | May 19, 1953 |
| 2,657,318 | Rock | Oct. 27, 1953 |
| 2,817,757 | Durbin | Dec. 24, 1957 |
| 2,829,251 | Patton | Apr. 1, 1958 |
| 2,864,053 | Woodworth | Dec. 9, 1958 |
| 2,866,103 | Blake et al. | Dec. 23, 1958 |
| 2,874,284 | Conger | Feb. 17, 1959 |